United States Patent
Hong et al.

(10) Patent No.: US 12,323,979 B2
(45) Date of Patent: Jun. 3, 2025

(54) INFORMATION PROCESSING METHOD AND APPARATUS, BASE STATION, UE, AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Wei Hong, Beijing (CN); Yajun Zhu, Beijing (CN); Xuemei Qiao, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 501 days.

(21) Appl. No.: 17/782,492

(22) PCT Filed: Dec. 3, 2019

(86) PCT No.: PCT/CN2019/122798
§ 371 (c)(1),
(2) Date: Jun. 3, 2022

(87) PCT Pub. No.: WO2021/109002
PCT Pub. Date: Jun. 10, 2021

(65) Prior Publication Data
US 2023/0011663 A1    Jan. 12, 2023

(51) Int. Cl.
*H04W 72/20* (2023.01)
*H04W 72/54* (2023.01)
*H04W 92/18* (2009.01)

(52) U.S. Cl.
CPC .......... *H04W 72/20* (2023.01); *H04W 72/54* (2023.01); *H04W 92/18* (2013.01)

(58) Field of Classification Search
CPC ...... H04W 72/20; H04W 72/54; H04W 92/18
See application file for complete search history.

(56) References Cited

U.S. PATENT DOCUMENTS

2018/0295646 A1\* 10/2018 Faurie .................. H04W 72/23
2019/0082459 A1\* 3/2019 Faurie .................. H04W 72/20
(Continued)

FOREIGN PATENT DOCUMENTS

| CN | 102006617 A | 4/2011 |
|----|-------------|--------|
| CN | 102158963 A | 8/2011 |

(Continued)

OTHER PUBLICATIONS

International Search Report of PCT/CN2019/122798 dated Sep. 3, 2020 with English translation, (6p).
(Continued)

*Primary Examiner* — Ajay Cattungal
(74) *Attorney, Agent, or Firm* — Arch & Lake LLP; Hao Tan; Shen Wang

(57) ABSTRACT

An information processing method, and the method includes: receiving, by a base station, a buffer status report BSR sent by a first user equipment UE; sending, by the base station, scheduling information to a corresponding second UE based on at least one of a number of the first UEs and the BSR; and allocating SL resource to the first UE according to received sidelink SL resource perception information reported by the second UE based on the scheduling information.

19 Claims, 14 Drawing Sheets

(56) References Cited

U.S. PATENT DOCUMENTS

| | | | | |
|---|---|---|---|---|
| 2019/0335532 | A1* | 10/2019 | Kim | H04W 76/11 |
| 2020/0229006 | A1* | 7/2020 | Chen | H04B 7/06954 |
| 2020/0288344 | A1* | 9/2020 | Zhang | H04W 76/11 |
| 2020/0288432 | A1* | 9/2020 | Min | H04W 4/40 |
| 2020/0314928 | A1* | 10/2020 | Kang | H04W 76/14 |
| 2021/0211850 | A1* | 7/2021 | Yang | H04W 72/02 |
| 2022/0174695 | A1* | 6/2022 | Lee | H04L 1/1864 |
| 2023/0011663 | A1* | 1/2023 | Hong | H04W 72/54 |

FOREIGN PATENT DOCUMENTS

| | | |
|---|---|---|
| CN | 108112087 A | 6/2018 |
| CN | 108370565 A | 8/2018 |
| CN | 109803431 A | 5/2019 |
| CN | 110381586 A | 10/2019 |
| CN | 110392360 A | 10/2019 |
| WO | 2018071051 A1 | 4/2018 |
| WO | 2018201390 A1 | 11/2018 |
| WO | 2019028900 A1 | 2/2019 |

OTHER PUBLICATIONS

Huawei, et al., "Mode-3 Sensing and Reporting for Resource Pool Sharing,", 3GPP TSG-RAN WG2 Meeting #101bis, R2-1805349, Sanya, China, Apr. 16-20, 2018, (3p).

Samsung, "Mode-3 behaviour in shared resource pools for V2X phase 2", 3GPP TSG-RAN WG2, Meeting #101, R2-1803038, Athens, Greece, Mar. 2, 2018, (3p).

Samsung, "Mode-3 behaviour in shared resource pools for V2X phase 2", 3GPP TSG RAN WG2 Meeting #100, R2-1713749, Reno, Nevada, Dec. 1, 2017, (3p).

Fraunhofer HHI, et al., "Resource Allocation for Mode 1 NR V2X", 3GPP TSG RAN WG1 #96bis, R1-1904329, Xi'an, China, Apr. 8-12, 2019, (5p).

Intel Corporation, "Network controlled sidelink resource allocation design for NR V2X communication", 3GPP TSG RAN WG1 Meeting #96bis, R1-1904295, Xi'an, China, Apr. 8-12, 2019, (8p).

CNOA issued in Application No. 201980003421.0 dated Nov. 28, 2023 with English translation, (9p).

Philippe Sartori, "Status report for Wi V2X phase 2 based on LTE," 3GPP TSG RAN meeting #81, RP-181671 Gold Coast, Australia, Sep. 10-13, 2018, (6p).

ZTE, "Discussion on mode-3 UE sensing report for resource pool sharing," 3GPP TSG-RAN WG2 Meeting #101bis, R2-1804507, Sanya, China, Apr. 16-20, 2018, (3p).

Ericsson, "DRX Ambiguity period," 3GPP Tsg-Ran WG2 #101Bis Tdoc, R2-1805407, Sanya, P.R. of China, Apr. 16-20, 2018, (5p).

First Chinese Office Action issued in Chinese Application No. 201980003421.0 dated Nov. 11, 2022, with partial English translation (9p).

* cited by examiner

INFORMATION PROCESSING METHOD AND APPARATUS, BASE STATION, UE, AND STORAGE MEDIUM

CROSS REFERENCE TO RELATED APPLICATIONS

The present disclosure is a U.S. national phase of International Application No. PCT/CN2019/122798, filed on Dec. 3, 2019, the entire content of which is incorporated herein by reference for all purposes.

TECHNICAL FIELD

The present disclosure relates to the field of wireless communication technologies, and in particular, to an information processing method, apparatus, base station, user equipment, and storage medium.

BACKGROUND

Vehicle-to-Everything (V2X) uses a sidelink (Sidelink, SL) between users to communicate. Compared with Long Term Evolution (LTE) V2X, new radio (NR) V2X may support more application scenarios, such as vehicle group driving, extended sensing, remote driving, and enhanced driving. In order to provide the above services, NR V2X needs to support higher transmission reliability and lower communication delay. The resource allocation method of LTE V2X is no longer applicable, and further research on the resource allocation mode is required.

At present, there are two main resource allocation modes for NR V2X: a mode of centralized scheduling from a base station and a mode of autonomous selection from user. The mode of centralized scheduling from a base station means that the base station controls the use of the SL resource pool, and the base station allocates the SL resource required by the user equipment (User Equipment, UE) for Sidelink transmission. The mode of autonomous selection from user means that the UE adopts a certain resource conflict avoidance mechanism to autonomously select the SL resource required for Sidelink transmission from the resource pool. In order to reduce the waste of spectrum resource and improve resource utilization, the two resource allocation modes may be used to share the resource pool.

SUMMARY

The present disclosure provides an information processing method, apparatus, base station, user equipment, and storage medium.

According to a first aspect of the present disclosure, an information processing method is provided, applied to a base station, the method includes:
  an information processing method, applied to a base station, wherein the method includes:
  receiving a buffer status report BSR sent by a first user equipment UE;
  sending scheduling information to a corresponding second UE based on at least one of a number of the first UEs and the BSR; and
  allocating SL resource to the first UE according to received sidelink SL resource perception information reported by the second UE based on the scheduling information.

According to a second aspect of the present disclosure, an information processing method is further provided, applied to a second user equipment UE, wherein the method includes:
  receiving scheduling information sent by a base station, wherein the scheduling information is information determined by the base station according to a buffer status report BSR sent by a first UE to the base station; and
  based on the scheduling information, reporting to the base station, SL resource perception information, wherein the SL resource perception information is adopted for the base station to allocate SL resource to the first UE.

According to a third aspect of the present disclosure, an information processing method is further provided, applied to a first user equipment UE, and the method includes:
  sending a BSR to the base station; wherein the BSR is adopted by the base station to determine scheduling information for scheduling a corresponding second UE to report SL resource perception information;
  receiving allocation information sent by the base station based on the SL resource perception information; and
  based on the allocation information, sending information to the second UE by using the SL resource allocated by the base station.

DETAILED DESCRIPTION

Embodiments will be described in detail herein, examples of which are illustrated in the accompanying drawings. Where the following description refers to the drawings, the same reference signs in different drawings refer to the same or similar elements unless otherwise indicated. The implementations described in the following embodiments are not intended to represent all implementations consistent with embodiments of the present disclosure. Rather, they are merely examples of apparatus and methods consistent with some aspects of embodiments of the present disclosure, as recited in the appended claims.

The terms used in the embodiments of the present disclosure are only for the purpose of describing particular embodiments, and are not intended to limit the embodiments of the present disclosure. As used in the embodiments of the present disclosure and the appended claims, the singular forms "a" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various pieces of information, such information should not be limited to these terms. These terms are only used to distinguish the same type of information from each other. For example, the first information may also be referred to as the second information, and similarly, the second information may also be referred to as the first information without departing from the scope of the embodiments of the present disclosure.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
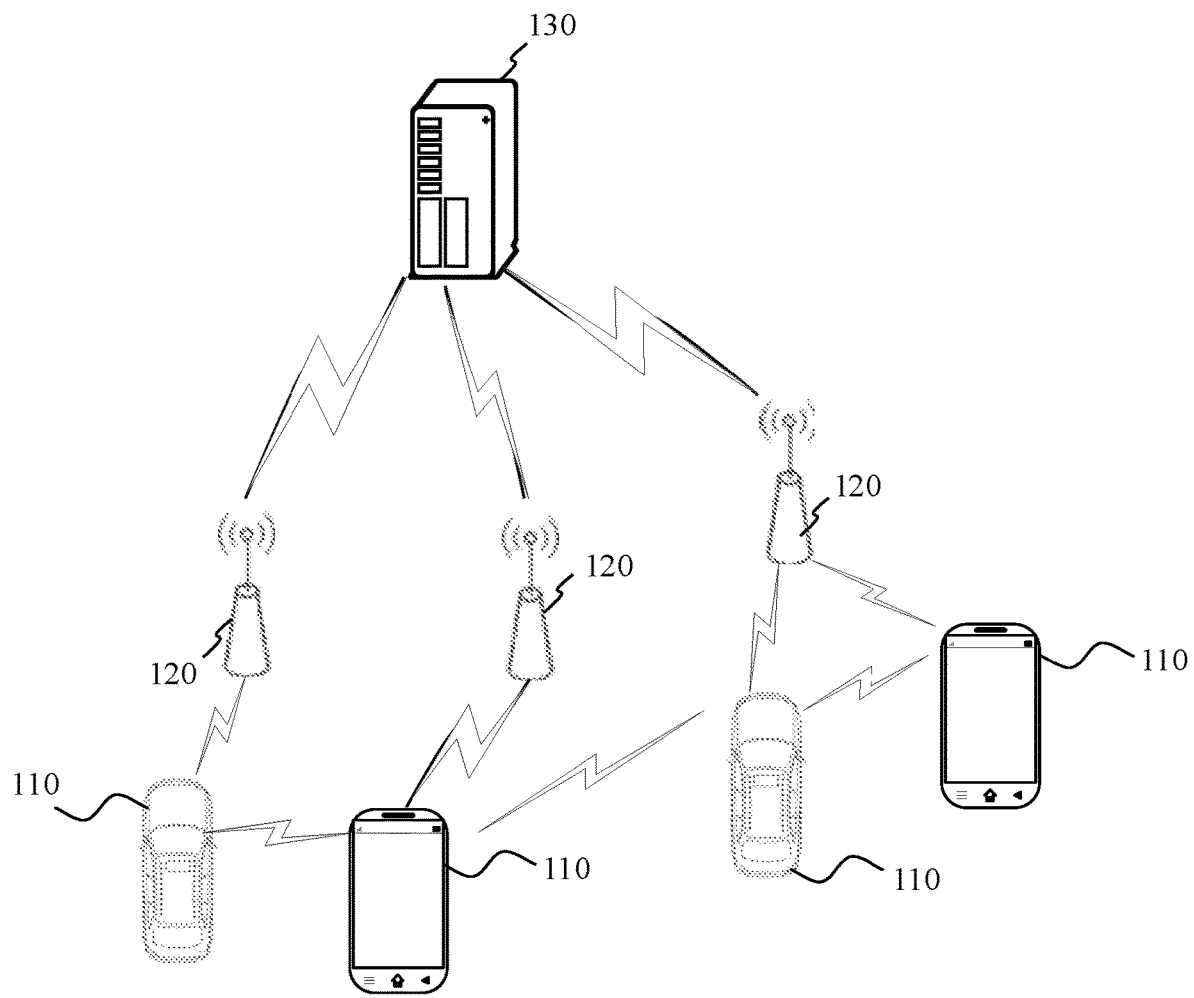
FIG. 1 is a schematic structural diagram of a wireless communication system according to an example of the present disclosure.

Please refer to FIG. 1, which shows a schematic structural diagram of a wireless communication system provided by an example of the present disclosure. As shown in FIG. 1, the wireless communication system is a communication system based on cellular mobile communication technology, and the wireless communication system may include: several user equipment 110 and several base stations 120.

The user equipment 110 may be a device that provides at least one of voice and data connectivity to a user. The user equipment 110 may communicate with one or more core networks via a Radio Access Network (RAN), and the user equipment 110 may be an Internet of Things (IoT) user equipment such as a sensor device, a mobile phone (or referred to as a "cellular" phone) and a computer with IoT user equipment, for example, may be stationary, portable, pocket-sized, hand-held, computer-built or vehicle-mounted. For example, Station (STA), subscriber unit), subscriber station, mobile station, mobile, remote station, access point, remote user equipment (remote terminal), access terminal, user terminal, user agent, user device, or user equipment. Alternatively, the user equipment 110 may also be a device of an unmanned aerial vehicle. Alternatively, the user equipment 110 may also be an in-vehicle device, for example, a trip computer with a wireless communication function, or a wireless user equipment connected to an external trip computer. Alternatively, the user equipment 110 may also be a roadside device, for example, may be a street light, a signal light, or other roadside devices with a wireless communication function.

The base station 120 may be a network-side device in a wireless communication system. The wireless communication system may be the 4th generation mobile communication (4G) system, also known as Long Term Evolution (LTE) system; or, the wireless communication system may also be a 5G system, also known as New Radio System or 5G NR System. Alternatively, the wireless communication system may also be a next-generation system of the 5G system. An access network in the 5G system may be called NG-RAN (New Generation-Radio Access Network, new generation radio access network).

The base station 120 may be an evolved base station (eNB) used in the 4G system. Alternatively, the base station 120 may also be a base station (gNB) that adopts a centralized distributed architecture in a 5G system. When the base station 120 adopts a centralized distributed architecture, it usually includes a centralized unit (central unit, CU) and at least two distributed units (distributed unit, DU). The centralized unit is provided with a protocol stack of a Packet Data Convergence Protocol (PDCP) layer, a Radio Link Control Protocol (Radio Link Control, RLC) layer, and a Media Access Control (MAC) layer. A physical (PHY) layer protocol stack is set in the distributed unit. The specific implementation manner of the base station 120 is not limited in the examples of the present disclosure.

A wireless connection may be established between the base station 120 and the user equipment 110 through a wireless air interface. In different examples, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new air interface, alternatively, the wireless air interface may also be a wireless air interface based on a next-generation mobile communication network technology standard of 5G.

In some examples, an E2E (End to End, end-to-end) connection may also be established between the user equipment 110, for example, scenarios of V2V (vehicle to vehicle, vehicle-to-vehicle) communication, V2I (vehicle to Infrastructure, vehicle-to-roadside equipment) communication and V2P (vehicle to pedestrian, vehicle-to-person) communication in vehicle to everything (V2X) communication etc.

In some examples, the above wireless communication system may further include a network management device 130.

Several base stations 120 are respectively connected to the network management device 130. The network management device 130 may be a core network device in a wireless communication system. For example, the network management device 130 may be a Mobility Management Entity (Mobility Management Entity, MME) in an Evolved Packet Core (EPC) network. Alternatively, the network management device may also be other core network devices, such as a serving gateway (Serving GateWay, SGW), a public data network gateway (Public Data Network GateWay, PGW), a policy and charging rules functional unit (Policy and Charging Rules Function, PCRF) or Home Subscriber Server (HSS), etc. The implementation form of the network management device 130 is not limited in the examples of the present disclosure.

Figure 2:
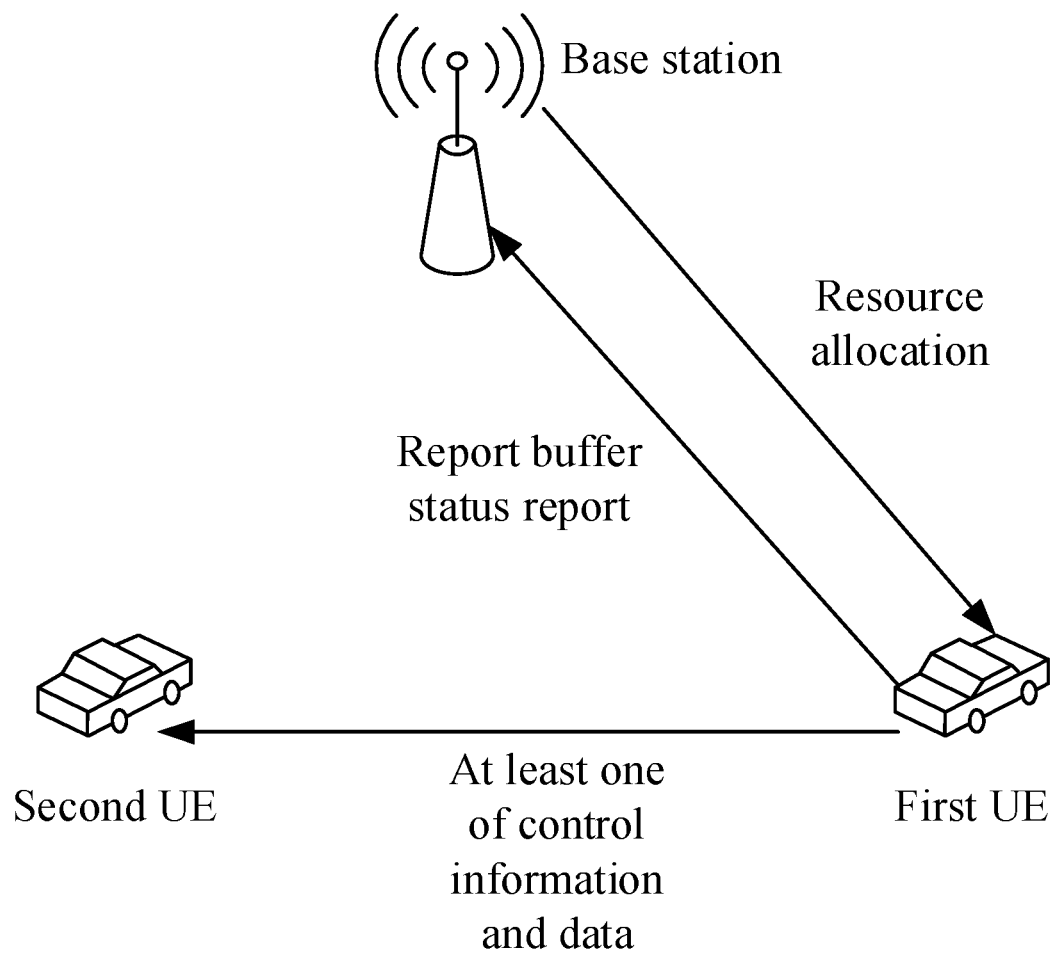
FIG. 2 is a schematic diagram illustrating a resource allocation method in a mode of centralized scheduling from a base station according to an example of the present disclosure.

Currently, V2X adopts SL for communication, and mainly adopts the following two modes for resource allocation:

In the first mode, as shown in FIG. 2, an example of the present disclosure provides a resource allocation method in a mode of centralized scheduling from a base station. Referring to FIG. 2, a first user equipment UE sends a buffer state report (Buffer State Report, BSR) of an inter-user sidelink (Sidelink, SL) to the base station; the base station allocates SL resource to the first UE based on the BSR, and send resource allocation (RA) information to the first UE; and the first UE sends information to a second UE based on the SL resource; wherein the information includes at least one of sidelink control information (Sidelink Control Information, SCI) and data.

Figure 3:
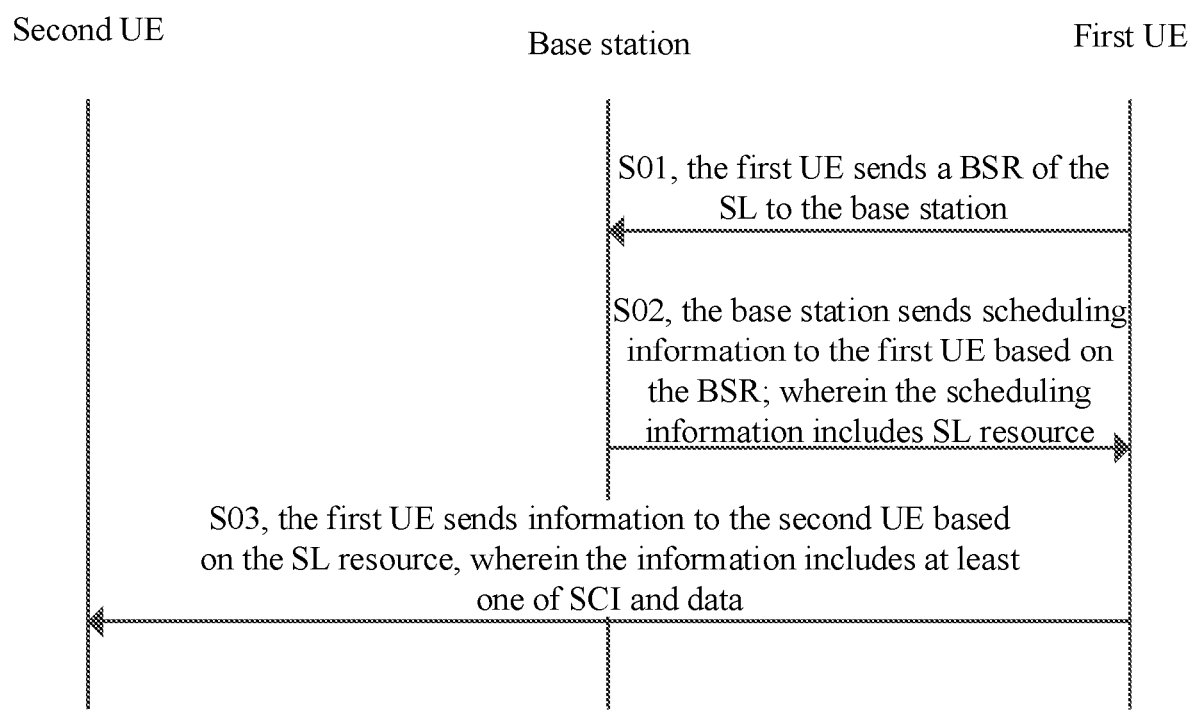
FIG. 3 is a flow chart illustrating a resource allocation method in a mode of centralized scheduling from a base station according to an example of the present disclosure.

In an example, as shown in FIG. 3, the resource allocation method in the centralized scheduling mode from the base station includes the following steps:

S01, the first UE sends a BSR of the SL to the base station;

S02, the base station sends scheduling information to the first UE based on the BSR; wherein the scheduling information includes SL resource;

S03, the first UE sends information to the second UE based on the SL resource, wherein the information includes at least one of SCI and data.

Figure 4:
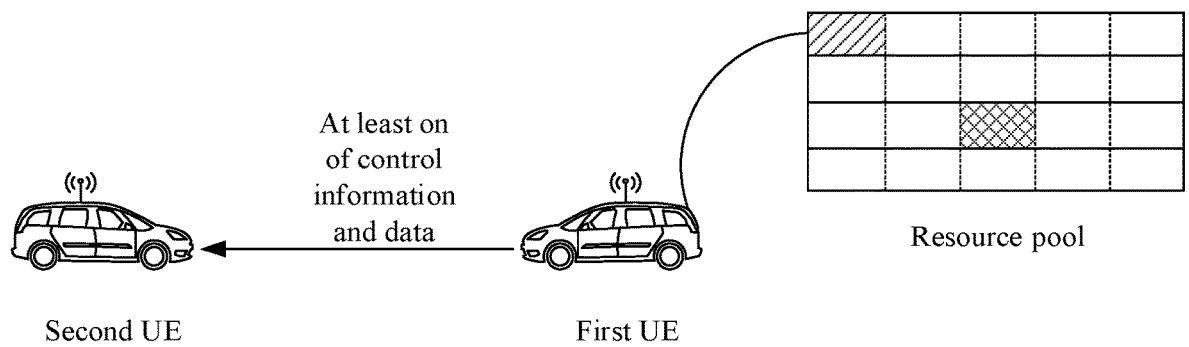
FIG. 4 is a schematic diagram illustrating a resource allocation method in a mode of autonomous selection scheduling from a UE according to an example of the present disclosure.

In the second mode, as shown in FIG. 4, an example of the present disclosure provides a resource allocation method based on a mode of autonomous selection from user equipment UE. Referring to FIG. 4, the first UE selects SL resource required for SL transmission from a preconfigured resource pool of the base station; and sends information to the second UE based on the SL resource; wherein the information includes at least one of SCI and data.

The resource pools used in the two modes shown in FIG. 2 and FIG. 4 are separate to each other and do not interfere with each other. In order to reduce the waste of resource and improve the utilization rate of resource, the above two modes may share the resource pool; thus, sharing resource pool in the above two resource pools, is necessary to reduce the mutual interference between the two resource allocation modes.

Figure 5:
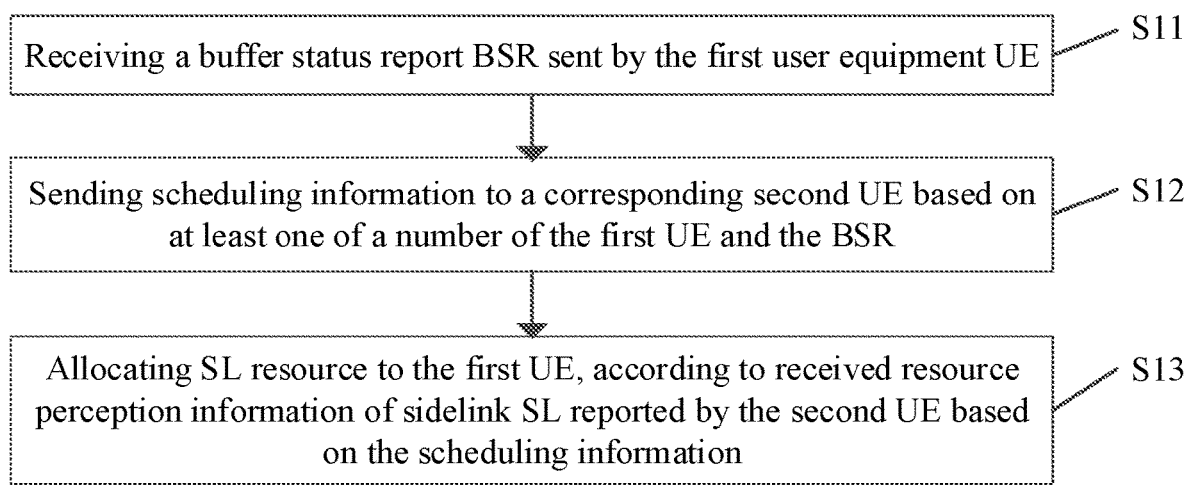
FIG. 5 is a flowchart illustrating an information processing method according to an example of the present disclosure.

As shown in FIG. 5, an example of the present disclosure provides an information processing method, and the method includes:

step S11, receiving a buffer status report BSR sent by the first user equipment UE;

step S12, sending scheduling information to a corresponding second UE based on at least one of a number of the first UE and the BSR; and step S13, allocating SL resource to the first UE, according to received resource perception information of sidelink SL reported by the second UE based on the scheduling information.

The information processing method described in the examples of the present disclosure is applied in a base station. Here, the base station is an interface device for the user equipment to access the Internet. The base station may be various types of base stations, for example, a 3G base station, a 4G base station, or a 5G base station.

In the example of the present disclosure, the first UE is a transmitting end UE; and the second UE is a receiving end UE. Here, the first UE and the second UE are both UEs under the signal coverage of the base station. It may be understood that the first UE and the second UE may be interchanged. In other examples, if the second UE needs to send at least one of data and control information to the first UE, the second UE is a transmitting end UE, and the first UE is a receiving end UE.

Here, both the first UE and the second UE may be a mobile phone, a computer, a server, a transceiver device, a tablet device, or a medical device, and so on.

Here, both the first UE and the second UE may be one or more UEs.

In some examples, a number of the first UEs is a number of the first UEs connected to the base station, or the number of the first UEs is a number of the first UEs that send the BSR to the base station.

In an example, the receiving the buffer status report BSR sent by the first user equipment UE includes: receiving the buffer status report BSR sent by the first user equipment based on service requirement. The service may include: at least one of periodic service and aperiodic service. Periodic services are services that are transmitted periodically; and aperiodic services may be services that are transmitted aperiodically.

In some examples, the BSR carries identification information of the second UE to notify the base station of the second UE corresponding to the BSR. There may be many ways of identifying the second UE, which are not limited in all examples of the present disclosure.

For example, in an example, the BSR carries the identification information of the second UE; wherein the identification information is adopted to indicate the corresponding second UE.

In an example, the identification information of the second UE may be a destination index. It may be understood that the BSR includes a media access control (Media Access Control Address, MAC) unit; wherein the MAC unit includes a destination index field; wherein the destination index field is as follows in Table 1, including: destination index 1. destination index2, . . . , destination index N−1, destination index N; wherein N is a natural number greater than or equal to 1. Here, a destination index field identifies a second UE, thus, in the example of the present disclosure, the base station may determine a corresponding second UE based on the destination index field, and send scheduling information to the second UE.

TABLE 1 schematic table of a MAC unit.

| destination index 1 | logical channel group identifier 1 | buffer size 1 |
|---|---|---|
| buffer size 1 logical channel group identifier 2 | destination index 2 buffer size 2 | |
| ... | | |
| destination index N-1 | logical channel group identifier N-1 | buffer size N-1 |
| buffer size N-1 logical channel group identifier N | destination index N-1 buffer size N | |

In other examples, the identification information may also be at least one of other numbers, letters and characters, etc., and the identification information may uniquely identify the second UE or any information of UEs within signal coverage of the base station. The specific message content is not limited here.

In an example, the base station receives the BSR sent by the first UE based on a physical uplink shared channel (Physical Uplink Shared Channel, PUSCH).

Here, the SL resource perception information includes, but is not limited to, at least one of the following: information of resource of the resource pool occupied by the respective UEs, and information of resource available to the second UE.

Here, the sending scheduling information to the second UE includes: sending the scheduling information based on at least one of the physical downlink channel (Physical Downlink Control Channel, PDCCH) and a physical downlink shared channel (Physical Downlink Shared Channel, PDSCH).

It may be understood that, the second UE may determine the SL resource perception information based on energy perception. For example, in SL monitoring, if another device occupies a certain SL resource, the second UE will receive a wireless signal transmitted on the SL resource, thereby generating the SL resource perception information.

In some examples, the method further includes:
sending allocation information for indicating the SL resource allocated for the first UE, to the first UE.

Here, sending the allocation information of the SL resource to the first UE includes: the base station sends the allocation information to the first UE through downlink control information (Downlink Control Information, DCI) format 5A. In this way, the first UE may obtain the SL resource by decoding the DCI format 5A.

Here, the SL resource includes but are not limited to one of the following: SL time-domain resource and SL frequency-domain resource.

In the example of the present disclosure, when the base station receives the BSR sent by the first UE, it may send the scheduling information to the second UE, so that the base station obtains the SL resource perception information reported by the second UE, and based on the SL resource perception information, sends the allocation information of the SL resource to the first UE. In this way, in the examples of the present disclosure, on the one hand, the base station may allocate the SL resource to the first UE based on the BSR reported by the first UE; on the other hand, the second UE may separately select the SL resource according to the SL resource perception information determined by the second UE; so that these two allocation modes may share the SL resource of the base station (i.e., the SL resource of the resource pool). In addition, since the base station may learn the occupancy condition of the SL resource from the second UE in time, it may reduce the mutual interference when the base station allocates SL resource to the UE or the UE autonomously selects resource, which may improve the reliability of transmitting at least one of data and control information based on SL under the premise of greatly improve the utilization rate of SL resource.

In some examples, the SL resource perception information reported by the second UE based on the scheduling information at least includes:
information of idle SL resource reported by the second UE based on the scheduling information.

Here, the idle SL resource include but are not limited to one of the following: idle SL time-domain resource and idle SL frequency-domain resource.

In some examples, the receiving the resource perception information of sidelink SL reported by the second UE based on the scheduling information includes:
receiving information of idle SL resource perceived by the second UE.

In a practical application, the resource pool of the base station includes a plurality of SL resource; and the information of SL resource here may be a SL resource position of the SL in the resource pool. Certainly, in other practical applications, the information of SL resource may also be identification information identifying the SL resource.

In the example of the present disclosure, the second UE may only report the information of the SL resource perceived by the second UE, such as: idle SL time-domain resource or idle SL frequency-domain resource. In this way, the base station may also only receive the information of the idle SL resource. Compared with receiving information of occupancy condition of the entire SL resource, the information of the SL resource reported by the second UE may be reduced. Moreover, since less information is reported, a waiting delay for the first UE to obtain the allocation information may also be reduced.

In some examples, the idle SL resource include: idle SL frequency-domain resource; wherein one of the frequency-domain resource includes one or more sub-channels, and each of the sub-channels includes one or more frequency-domain resource blocks.

In other examples, the idle SL resource include: idle SL time-domain resource; wherein one of the time-domain resource includes one or more transmission time intervals, and each of the transmission time intervals includes one or more time-domain resource blocks.

In one example, the sub-channel includes 5 frequency-domain resource blocks.

In an example, predetermined frequency-domain resource blocks included in the sub-channel are less than or equal to 10 frequency-domain resource blocks. In this way, on the premise of reducing the waiting delay of the first UE, the reliability of data transmission may also be ensured.

In an example, the one transmission time interval (Transmission Time Interval, TTI) is 1 ms.

In practical applications, it is at least one of that a minimum unit (also referred to as granularity) for sending information of the frequency-domain resource is generally a frequency-domain resource block, and that the granularity for sending time-domain information is generally a time-domain resource block. In the example of the present disclosure, it is at least one of that the one frequency-domain resource includes one sub-channel, the one sub-channel includes one or more frequency-domain resource blocks, and that the one time-domain resource includes time-domain resource blocks within one transmission time interval. In this way, in the example of the present disclosure, it is at least one of that the information of the SL resource may transmit the information of the frequency-domain resource at the granularity of a predetermined number of frequency-domain resource blocks, and that the information of the SL resource may transmit the information of the time-domain resource at the granularity of one transmission time interval. In this way, the examples of the present disclosure may further shorten reporting time of the idle SL time-domain resource or idle SL frequency-domain resource, thereby further reducing waiting time of the first UE waiting for the base station to allocate resource to the first UE.

In some examples, the sending scheduling information to the corresponding second UE based on at least one of the number of the first UE and the BSR includes:

according to at least one of the number of the first UEs and the BSR, the scheduling information including a reporting-number instruction is sent to the second UE, wherein the reporting-number instruction is adopted to instruct a number of perceived SL resource positions to be reported by the second UE.

In the examples of the present disclosure, the SL resource position refers to at least one of a SL time-domain resource position and a SL frequency-domain resource position.

In some examples, in response to at least one of that the number of the first UEs reaches a first state and that the BSR reaches a second state, the reporting-number instruction is adopted to instruct the second UE to report the first number of SL resource positions;

or, in response to the number of the first UEs does not reach the first state, the reporting-number instruction is adopted to instruct the second UE to report the second number of SL resource positions;

or, in response to the BSR does not reach the second state, the reporting-number instruction is adopted to instruct the second UE to report the second number of SL resource positions;

wherein the second number is smaller than the first number.

The number of the first UEs reaching the first state, includes:

that the number of the first UEs sending the BSR reaches a first number threshold; and the BSR reaching the second state, includes:

that a buffered data volume indicated by the BSR reaches a first data volume threshold.

Here, in response to the number of the first UEs sending the BSR reaches the first number threshold, the second UE is instructed to report the number of SL resource positions by the first number; and in response to the number of the first UEs sending the BSR does not reach the first number threshold, the second UE is instructed to report the number of SL resource positions by the second number.

In an example, the first number of the SL resource positions to be sent is equal to the number of the first UEs.

In another example, the first number of the SL resource positions to be sent is greater than the number of the first UEs. A part of the first UEs correspond to one SL resource position, and another part of the first UEs correspond to two or more SL resource positions.

Similarly, the number of the SL resource positions to be reported by the second UE to be instructed may also be determined according to the buffered data volume indicated by the BSR. For example: in response to the buffered data volume indicated by the BSR reaches the first data volume threshold, the number of the SL resource positions to be reported by the second UE is instructed to be the first number; and in response to the buffered data volume indicated by the BSR does not reach the first data volume threshold, the number of the SL resource positions to be reported by the second UE is instructed to be the second number.

In this way, in the example of the present disclosure, the base station correspondingly requires the second UE to send the number of SL resource positions, according to at least one of the number of UEs connected to the base station, the number of the first UEs that send the BSR, and the buffered data volume indicated by the BSR.

Specifically, in response to at least one of that the number of UEs connected to the base station is large, that the number of the first UEs that send the BSR is large, and that the buffered data volume indicated by the BSR is large, the number of the perceived SL resource positions to be reported by the second UE to be instructed, included in the scheduling information that the base station sends to the second UE, is large. In this way, excessive scheduling waiting delay caused by less scheduling SL resource may be reduced, and the probability of collision of SL resource may be reduced.

In response to at least one of that the number of UEs connected to the base station is small, that the data volume of the first UEs that send the BSR is small, and that the buffered data volume indicated by the BSR is small, the number of the perceived SL resource positions to be reported by the second UE to be instructed, included in the scheduling information that the base station sends to the second UE, is small. In this way, excessive occupation of transmission resource due to that more SL resource information is invoked when it does not need so many SL resource, is reduced, thereby reducing resource overhead used in reporting the idle SL resource information by the second UE.

For example, at a moment, in response to the number of UEs connected to the base station is 10, the base station sends scheduling information to the second UE, including instructing the second UE to report perceived 8 idle SL resource positions. At another moment, in response to the number of UEs connected to the base station is 5, the base station sends scheduling information to the second UE, including instructing the second UE to report perceived 4 idle SL resource positions.

For another example, at a moment, in response to the number of the first UEs sending the BSR is 10, the base station sends scheduling information to the second UE, including instructing the second UE to report perceived 10 idle SL resource positions. At another moment, in response to the number of the first UEs sending the BSR is 5, the base station sends scheduling information to the second UE, including instructing the second UE to report perceived 5 idle SL resource positions.

For another example, at a moment, in response to the buffered data volume indicated by the BSR is 1G, the base station sends scheduling information to the second UE, including instructing the second UE to report perceived 10 idle SL resource positions. At another moment, in response to the buffered data indicated by the BSR is 0.5G, the base station sends scheduling information to the second UE, including instructing the second UE to report perceived 5 idle SL resource positions.

In this way, in the example of the present disclosure, the number of SL resource that the second UE is required to send, is dynamically determined, according to at least one of the number of UEs connected to the base station, the number of the first UEs sending BSR, and the buffered data volume indicated by the BSR. Any one or more of the number of UEs connected to the base station, the number of the first UEs sending BSR, and the buffered data volume indicated by the BSR, is currently large, the base station may require the second UE to send a corresponding number of SL resource.

For example, in response to the number of UEs connected to the base station is 10, the base station sends scheduling information to the second UE, including instructing the second UE to report perceived 8 idle SL resource positions. For another example, in response to the number of UEs connected to the base station is 5, the base station sends scheduling information to the second UE, including instructing the second UE to report perceived 4 idle SL resource positions.

In this way, in the example of the present disclosure, based on at least one of the number of UEs connected to the base station, the number of the first UEs sending BSR, and the buffered data volume indicated by the BSR, an appropriate scheduling information instructing the second UE to report the number of perceived idle SL resource positions may be dynamically selected, so as to schedule the SL resource; thus, the SL resource utilization rate may be improved, and at the same time the waiting delay of the first UE may be further reduced, and so on.

In some examples, the receiving resource perception information of sidelink SL reported by the second UE based on the scheduling information includes:

receiving the SL resource perception information reported by the second UE based on at least one of a physical uplink control channel (Physical Uplink Control Channel, PUCCH) and a physical uplink shared channel.

In the example of the present disclosure, the SL resource perception information may be transmitted through at least one of the physical uplink control channel or the physical uplink shared channel, thus providing various ways of uploading the SL resource perception information, and improving upload efficiency of the SL resource perception information.

It should be pointed out here that the following description of an information processing method is applied to the second UE, and is similar to the description of the information processing method applied to the base station above. For technical details not disclosed in the examples of the information processing method applied to the second UE in the present disclosure, please refer to the description of the examples of the information processing method applied to the base station in the present disclosure, and no detailed description will be given here.

Figure 6:
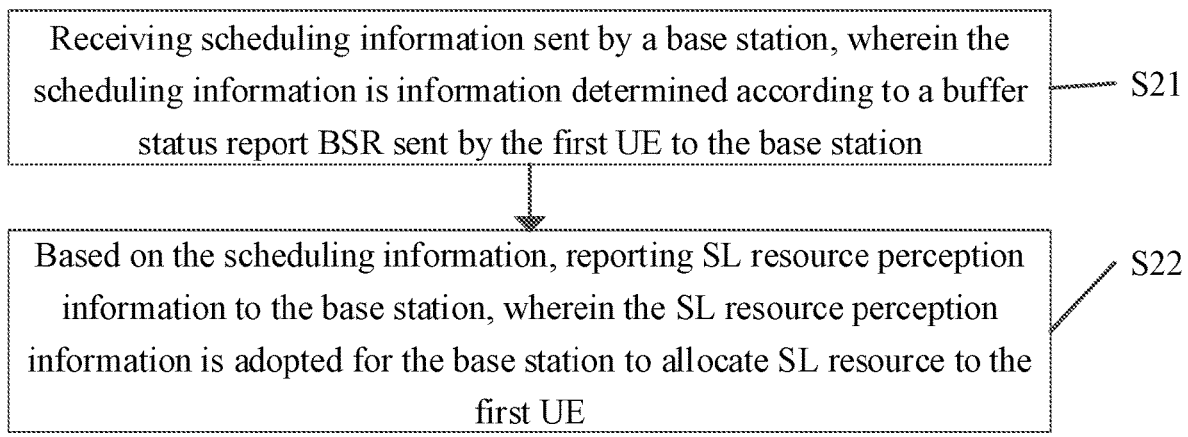
FIG. 6 is a flowchart illustrating another information processing method according to an example of the present disclosure.

As shown in FIG. 6, an example of the present disclosure provides an information processing method, and the method includes:

step S21, receiving scheduling information sent by a base station, wherein the scheduling information is information determined according to a buffer status report BSR sent by the first UE to the base station; and step S22, based on the scheduling information, reporting SL resource perception information to the base station, wherein the SL resource perception information is adopted for the base station to allocate SL resource to the first UE.

Here, in practical applications, the second UE may also acquire idle SL resource based on the SL perception information acquired by the second UE; and send information to other UEs based on the idle SL resource.

In some examples, the BSR carries identification information of the second UE to notify the base station of the second UE corresponding to the BSR. There may be many ways of identifying the second UE, which are not limited in all examples of the present disclosure.

Here, in practical applications, the second UE may perceive the usage condition of the SL resource in real time.

In some examples, the reporting SL resource perception information to the base station SL, wherein the SL resource perception information is adopted for the base station to allocate SL resource to the first UE, includes:

sending the information of the idle SL resource determined by the second UE to the base station.

Here, the idle SL resource include: at least one of idle SL frequency-domain resource and idle SL time-domain resource.

In some examples, the idle SL resource include: idle SL frequency-domain resource; wherein each idle SL frequency-domain resource includes at least one sub-channel, and each sub-channel includes one or more frequency-domain resource blocks.

In some examples, the idle SL resource include: idle SL time-domain resource; wherein each idle SL time-domain resource includes one or more time-domain resource blocks within a transmission time interval.

In some examples, the reporting of the SL resource perception information to the base station includes:

reporting the SL resource perception information to the base station based on at least one of the physical uplink control channel and the physical uplink shared channel.

It should be pointed out here that the following description of an information processing method is applied to the first UE, and is similar to the description of the information processing method applied to the base station above. For the technical details not disclosed in the examples of the information processing method applied to the first UE in the present disclosure, please refer to the description of the examples of the information processing method applied to the base station in the present disclosure, and no detailed explanation is given here.

Figure 7:
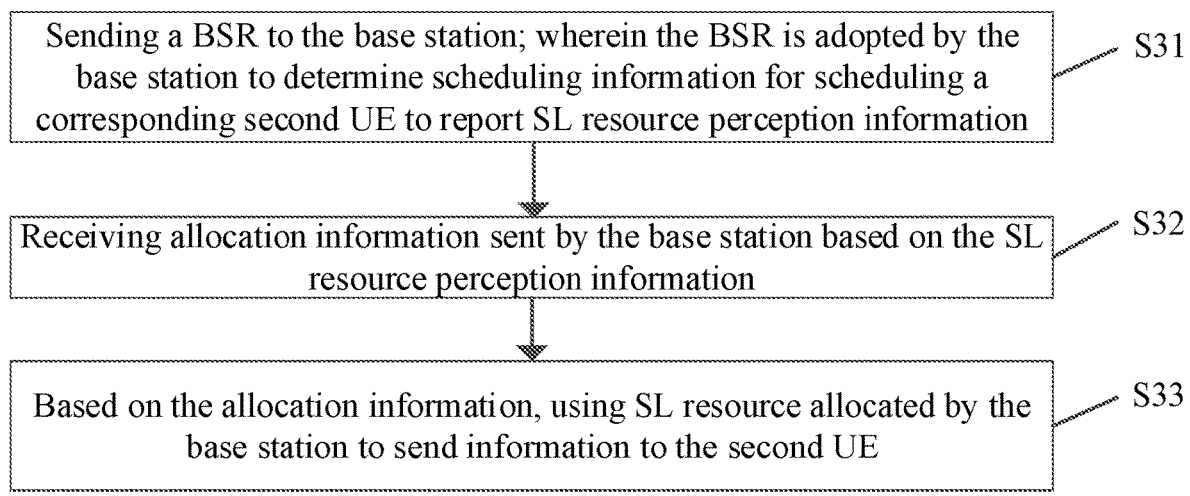
FIG. 7 is a flowchart illustrating yet another information processing method according to an example of the present disclosure.

As shown in FIG. 7, an example of the present disclosure provides an information processing method, and the method includes:

step S31, sending a BSR to the base station; wherein the BSR is adopted by the base station to determine scheduling information for scheduling a corresponding second UE to report SL resource perception information;

step S32, receiving allocation information sent by the base station based on the SL resource perception information;

step S33, based on the allocation information, using SL resource allocated by the base station to send information to the second UE.

Example 1

Figure 8:
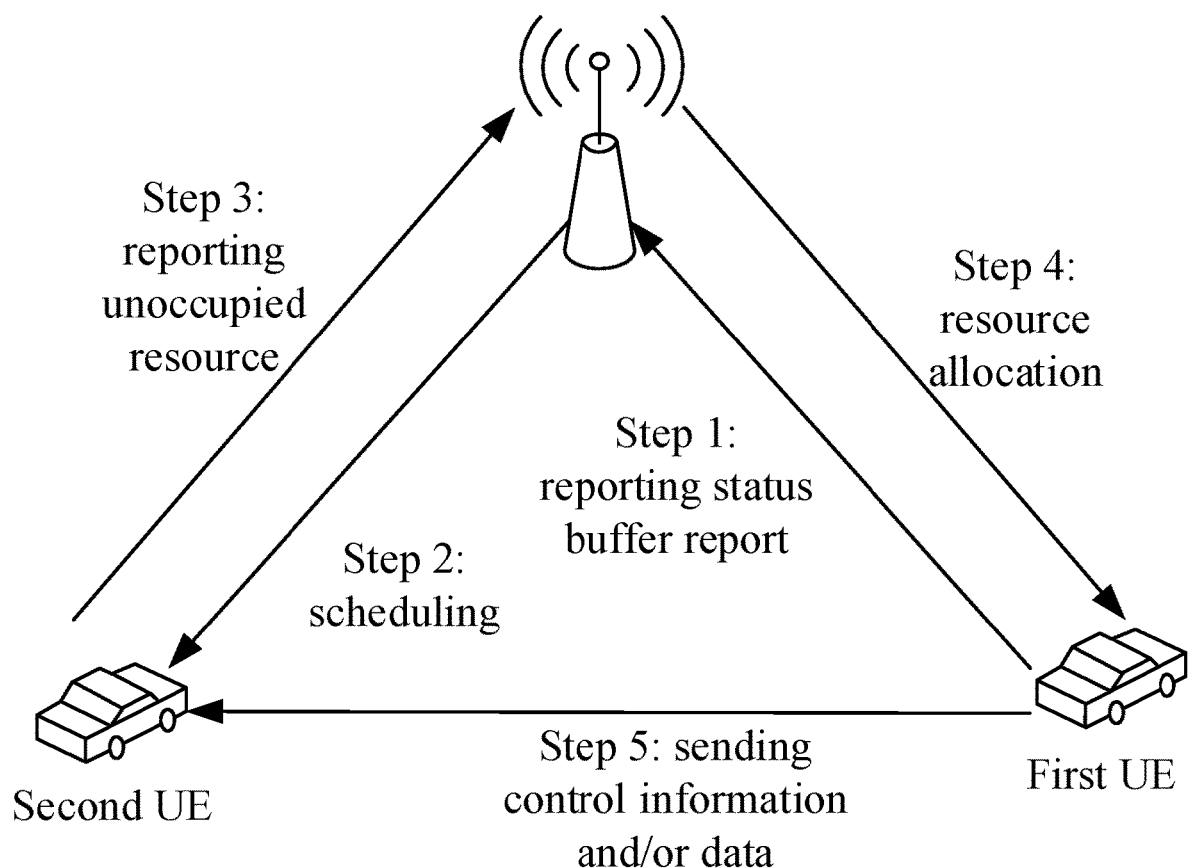
FIG. 8 is a schematic diagram illustrating an information processing method according to an example of the present disclosure.

To further describe the examples of the present disclosure in detail, the examples of the present disclosure further provide an information processing method, which is applied to an information processing system. As shown in FIG. 8, the information processing system includes: a first UE, a second UE, and a base station. The first UE and the second UE are within coverage of a cellular network of the base station.

In an example, a service in the information processing method is a periodic service.

Figure 9:
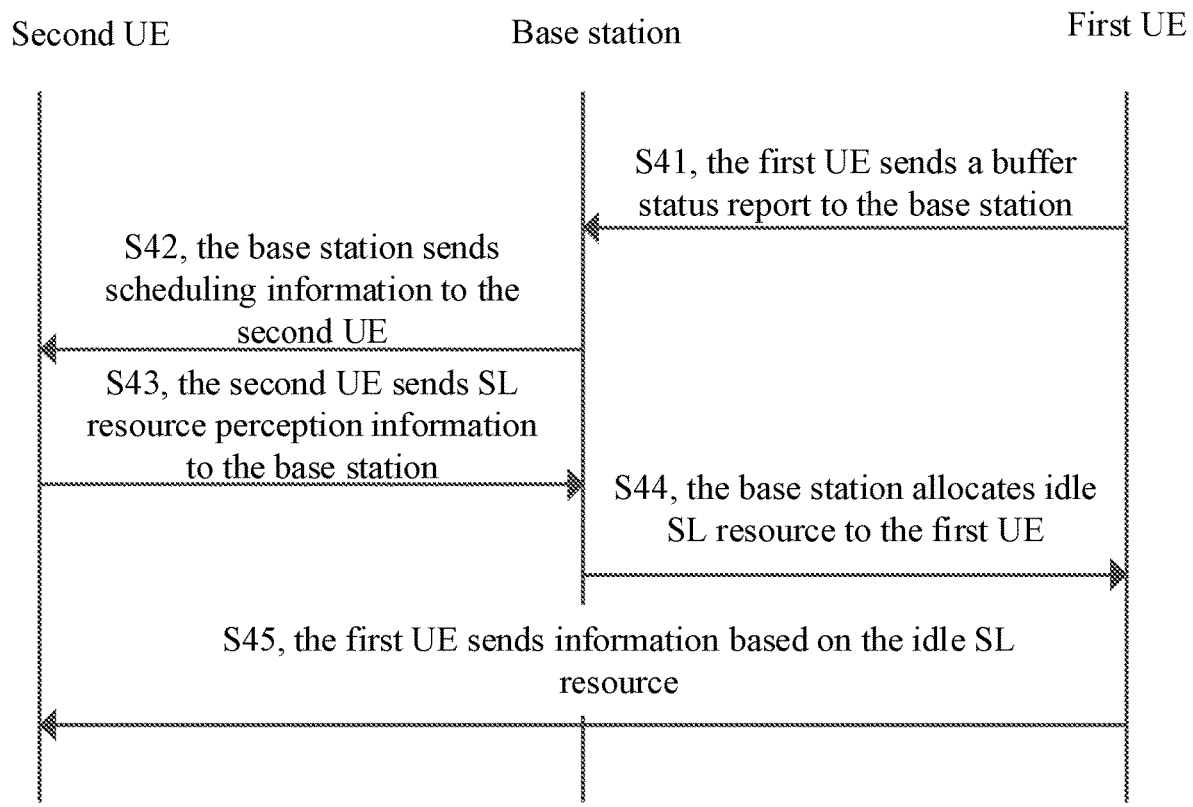
FIG. 9 is a flowchart illustrating an information processing method according to an example of the present disclosure.

As shown in FIG. 9, the information processing method includes the following steps: S41, the first UE sends a buffer status report to the base station.

Specifically, in response to the first UE generates a service, the sidelink buffer status report BSR is determined based on the service; and the BSR is sent to the base station through a physical uplink shared channel (Physical Uplink Shared Channel, PUSCH); wherein the BSR carries identity information of the second UE.

S42, the base station sends scheduling information to the second UE.

Specifically, the base station determines a corresponding second UE based on the BSR, and sends scheduling information to the second UE through at least one of the PDCCH and the PDSCH.

S43, the second UE sends SL resource perception information to the base station.

Specifically, after the second UE receives the scheduling information, the second UE acquires SL resource perception information, and sends the SL resource perception information to the base station.

In an example, the SL resource perception information includes: at least one of idle SL time-domain resource and idle SL frequency-domain resource.

In an example, the second UE may continuously perceive the SL resource perception information.

S44, the base station allocates idle SL resource to the first UE.

Specifically, the base station determines occupancy condition of the SL resource based on the SL resource perception information; and determines a idle SL resource position based on the occupancy condition of the SL resource, and sends the SL resource position to the first UE.

Here, the idle SL resource include: at least one of idle SL time-domain resource and idle SL frequency-domain resource.

Here, the idle SL resource position include: at least one of idle SL time-domain resource positions and idle SL frequency-domain resource positions.

S45, the first UE sends information based on the idle SL resource.

Specifically, the first UE sends the information to the second UE based on at least one of the idle SL time-domain resource and the idle SL frequency-domain resource, wherein the information includes at least one of control information and data.

It should be noted that: please refer to FIG. 8 again. In FIG. 8, step 1: reporting the buffer status report, which may be the above step S41; step 2: scheduling, which may be the above step S42; step 3: reporting unoccupied resource, which may be the above step S43; step 4: resource allocation, which may be the above step S44; and step 5: sending at least one of control information and data, which may be the above step S45.

In the examples of the present disclosure, on the one hand, it may be realized that the base station allocates SL resource to the first UE based on the BSR reported by the first UE; on the other hand, the second UE may also autonomously select SL resource based on the perceived SL perception information; In this way, the above two modes may share the SL resource of the base station (ie, the SL resource of the resource pool); and, because the base station may learn occupancy condition of SL resource from the second UE in time, it may reduce mutual interference when the base station allocates SL resource to the UE or the UE autonomously selects resource, and may improve the reliability of transmitting at least one of data and control information based on SL on the premise of greatly improving the utilization rate of SL resource.

Moreover, if the second UE only reports at least one of the information of idle SL time-domain resource and frequency-domain resource, resource overhead such as the transmission channel used for reporting the SL resource may also be reduced, such that the waiting delay of the first UE may be reduced.

Figure 10:
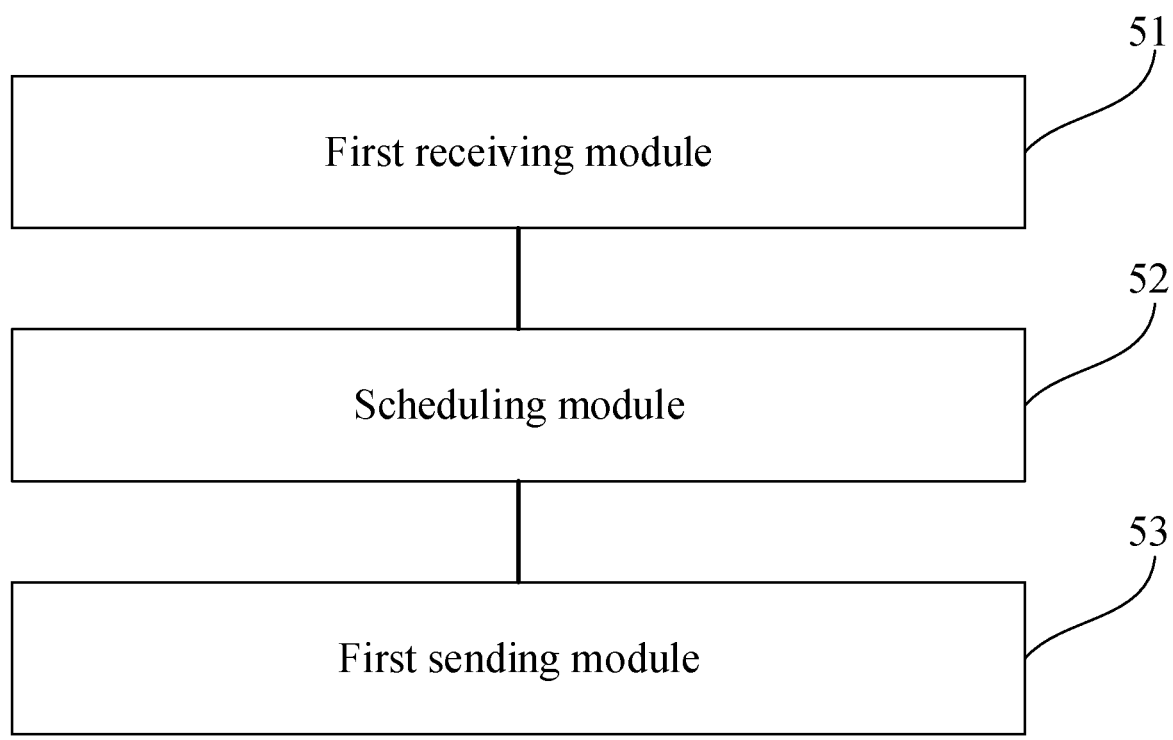
FIG. 10 is a schematic diagram illustrating an information processing apparatus according to an example of the present disclosure.

As shown in FIG. 10, an example of the present disclosure provides an information processing apparatus, which is applied to a base station, wherein the apparatus includes: a first receiving module 51 and a scheduling module 52; wherein the first receiving module 51 is configured to receive a buffer status report BSR sent by the first user equipment UE;

the scheduling module 52 is configured to send scheduling information to a corresponding second UE based on at least one of a number of the first UEs and the BSR; and the first receiving module is further configured to allocate SL resource to the first UE according to received sidelink SL resource perception information reported by the second UE based on the scheduling information.

In some examples, the apparatus further includes:

a first sending module 53, configured to send, to the first UE, allocation information for indicating the SL resource allocated for the first UE.

In some examples, the SL resource perception information reported by the second UE based on the scheduling information at least includes: information of idle SL resource reported by the second UE based on the scheduling information.

In some examples, the idle SL resource include: idle SL frequency-domain resource; wherein each idle SL frequency-domain resource includes at least one sub-channel, and each sub-channel includes one or more frequency-domain resource blocks.

In some examples, the idle SL resource include: idle SL time-domain resource; wherein one of the time-domain resource includes one or more time-domain resource blocks within a transmission time interval.

In some examples, the scheduling module 52 is configured to send the scheduling information including a reporting-number instruction to the second UE according to at least one of the number of the first UEs and the BSR, wherein the reporting-number instruction is adopted to instruct a number of perceived SL resource positions to be reported by the second UE.

In some examples, the scheduling module 52 is configured to, in response to at least one of that the number of the first UEs reaches a first state and that the BSR reaches a second state, the reporting-number instruction is adopted to instruct the second UE to report the first number of SL resource positions;

or, in response to at least one of that the number of the first UEs does not reach the first state and that the BSR does not reach the second state, the reporting-number instruction is adopted to instruct the second UE to report the second number of SL resource positions;

or, in response to the BSR has not reached the second state, the reporting-number instruction is adopted to instruct the second UE to report the second number of SL resource positions;

wherein the second number is smaller than the first number.

In some examples, that the number of the first UEs reaching the first state includes:

that a number of the first UEs sending the BSR reaches a first number threshold; and the BSR reaching the second state includes:

that a buffered data volume indicated by the BSR reaches a first data volume threshold.

In some examples, the first receiving module 51 is configured to receive the SL resource perception information reported by the second UE by using at least one of a physical uplink control channel and a physical uplink shared channel.

In some examples, the BSR carries identification information of the second UE; wherein the identification information is adopted to indicate a corresponding second UE.

In some examples, the number of the first UEs is a number of the first UEs connected to the base station, or the number of the first UEs is a number of the first UEs that send the BSR to the base station.

Figure 11:
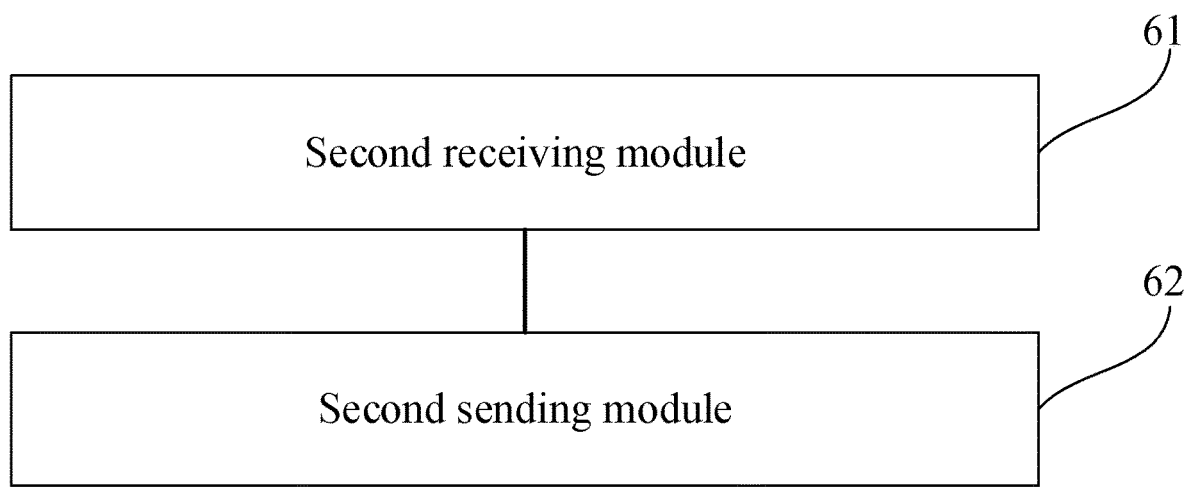
FIG. 11 is a schematic diagram illustrating another information processing apparatus according to an example of the present disclosure.

As shown in FIG. 11, an example of the present disclosure provides an information processing apparatus, which is applied to a second UE, wherein the apparatus includes: a second receiving module 61 and a second sending module 62; wherein the second receiving module 61 is configured to receive scheduling information sent by the base station, wherein the scheduling information is information determined by the base station according to the buffer status report BSR sent by the first UE to the base station; and the second sending module 62 is configured to, based on the scheduling information, report SL resource perception information to the base station SL, wherein the SL resource perception information is adopted for the base station to allocate SL resource to the first UE.

In some examples, the second sending module 62 is configured to send information of the idle SL resource determined by the second UE to the base station.

In some examples, the idle SL resource include: idle SL frequency-domain resource; wherein each idle SL frequency-domain resource includes at least one sub-channel, and each sub-channel includes one or more frequency-domain resource blocks.

In some examples, the idle SL resource include: idle SL time-domain resource; wherein each idle SL time-domain resource includes one or more time-domain resource blocks within a transmission time interval.

In some examples, the second sending module 62 is configured to report the SL resource perception information to the base station based on at least one of a physical uplink control channel and a physical uplink shared channel.

Figure 12:
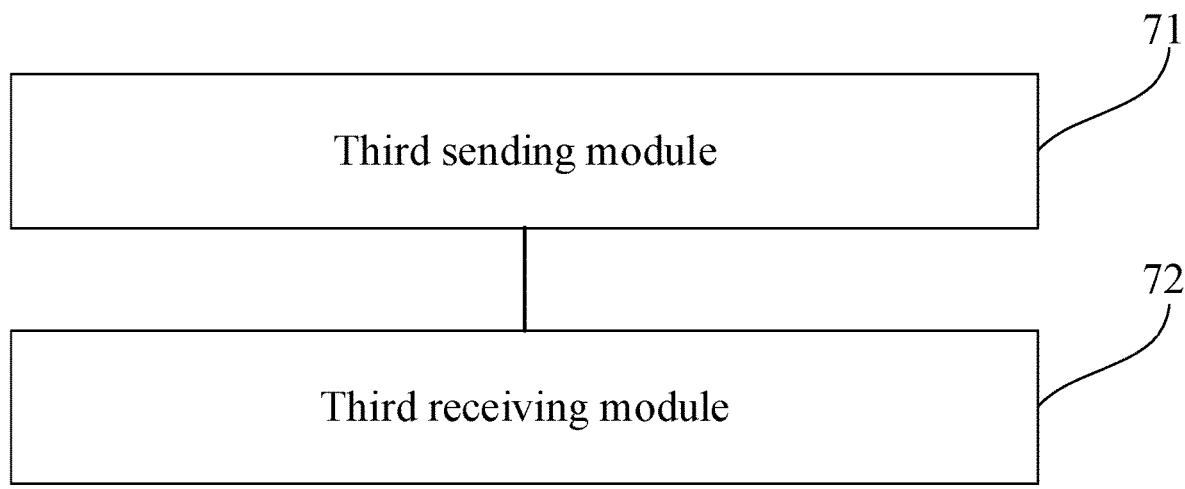
FIG. 12 is a schematic diagram illustrating yet another information processing apparatus according to an example of the present disclosure.

As shown in FIG. 12, an example of the present disclosure provides an information processing apparatus, which is applied to a first UE, wherein the apparatus includes: a third sending module 71 and a third receiving module 72; wherein the third sending module 71 is configured to send a BSR to the base station, wherein the BSR is adopted by the base station to determine scheduling information for scheduling a corresponding second UE to report the SL resource perception information;

the third receiving module 72 is configured to receive allocation information sent by the base station based on the SL resource perception information; and the third sending module 71 is further configured to, based on the allocation information, send information to the second UE by using the SL resource allocated by the base station.

Regarding the apparatuses in the above-mentioned examples, the specific manner in which each module performs an operation has been described in detail in the example of the method, and will not be described in detail here.

An example of the present disclosure further provides a base station, and the base station includes:

a first processor; and a first memory for storing instructions executable by the first processor;

wherein the first processor is configured to: when running a computer service, realize the information processing method described in any example of the present disclosure applied to the base station.

An example of the present disclosure further provides a second UE, and the second UE includes:

a second processor; and a second memory for storing instructions executable by the second processor;

wherein the second processor is configured to: when running a computer service, realize the information processing method described in any example of the present disclosure applied to the second UE.

An example of the present disclosure further provides a first UE, and the first UE includes:

a third processor;

a third memory for storing instructions executable by the third processor;

wherein the third processor is configured to: when running a computer service, realize the information processing method described in any example of the present disclosure applied to the first UE.

The memory (including at least one of the first memory, the second memory and the third memory) may include various types of storage media, and the storage media is a non-transitory computer storage medium, which may continue to memorize the information stored thereon after the communication device is powered off.

The processor may be connected to a memory (including at least one of the first memory, the second memory and the third memory) through a bus or the like, for reading executable programs stored in the memory, for example, at least one of the methods as shown in FIGS. 5 to 7 and FIG. 9.

Examples of the present disclosure further provide a computer-readable storage medium, and an executable program is stored in the computer-readable storage medium, wherein, when the executable program is executed by a processor, the information processing method described in any of the foregoing examples is realized. For example, at least one of the methods shown in FIGS. 5 to 7 and FIG. 9 is implemented.

Regarding the apparatuses in the above examples, the specific manner in which each module performs an operation has been described in detail in the example of the method, and will not be described in detail here.

Figure 13:
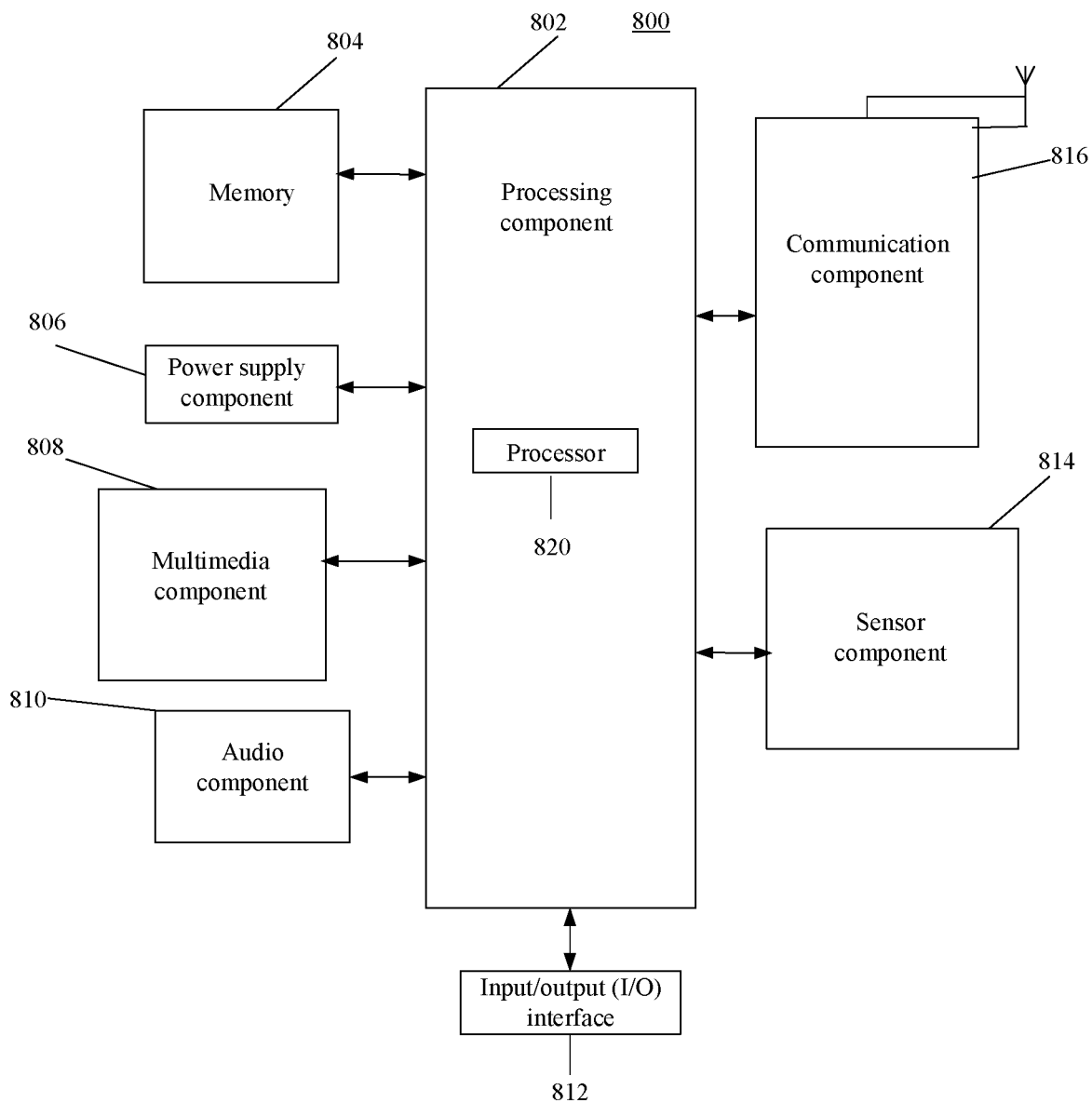
FIG. 13 is a schematic diagram illustrating a user equipment according to an example of the present disclosure.

FIG. 13 is a block diagram of user equipment (UE) 800 according to an example. For example, user equipment 800 may be a mobile phone, computer, digital broadcast user equipment, messaging device, game console, tablet device, medical device, fitness device, personal digital assistant, and the like.

Referring to FIG. 8, the user equipment 800 may include one or more of the following components: processing component 802, memory 804, power supply component 806, multimedia component 808, audio component 810, input/output (I/O) interface 812, sensor component 814, and communication component 816.

The processing component 802 generally controls the overall operation of the user equipment 800, such as operations associated with display, phone calls, data communications, camera operations, and recording operations. The processing component 802 may include one or more processors 820 to execute instructions to fulfill all or some of the steps of the methods described above. Additionally, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support operations on the user equipment 800. Examples of such data include instructions for any application or method operating on the user equipment 800, contact data, phonebook data, messages, pictures, videos, and the like. The memory 804 may be realized by any type of volatile or nonvolatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the user equipment 800. Power components 806 may include a power management system, one or more power sources, and other components associated with generating, managing, and distributing power for the user equipment 800.

The multimedia component 808 includes a screen that provides an output interface between the user equipment 800 and the user. In some examples, the screen may include a liquid crystal display (LCD) and a touch panel (TP). If the screen includes a touch panel, the screen may be implemented as a touch screen to receive input signals from a user. The touch panel includes one or more touch sensors to sense touch, slide, and gestures on the touch panel. The touch sensor may not only sense the boundaries of a touch or slide action, but also detect the duration and pressure associated with the touch or slide action. In some examples, the multimedia component 808 includes at least one of a front-facing camera and a rear-facing camera. When the user equipment 800 is in an operation mode, such as a shooting mode or a video mode, at least one of the front camera and the rear camera may receive external multimedia data. Each of the front and rear cameras may be a fixed optical lens system or have focal length and optical zoom capability.

It at least one of that the audio component 810 is configured to output audio signals, and that the audio component 810 is configured to input audio signals. For example, audio component 810 includes a microphone (MIC) that is configured to receive external audio signals when the user equipment 800 is in operating modes, such as call mode, recording mode, and voice recognition mode. The received audio signal may be further stored in memory 804 or transmitted via the communication component 816. In some examples, audio component 810 further includes a speaker for outputting audio signals.

The I/O interface 812 provides an interface between the processing component 802 and peripheral interface modules, the peripheral interface modules may be keyboards, click wheels, buttons, and the like. These buttons may include, but are not limited to: home button, volume buttons, start button, and lock button.

The sensor assembly 814 includes one or more sensors for providing status assessment of respective aspects of the user equipment 800. For example, the sensor component 814 may detect the open/closed state of the device 800, and the relative positioning of components such as the display and keypad of the user equipment 800, the sensor component 814 may also detect a position change of the user equipment 800 or a component of the user equipment 800, the presence or absence of contact between the user and the user equipment 800, the orientation or acceleration/deceleration of the user equipment 800, and the temperature change of the user equipment 800. The sensor assembly 814 may include a proximity sensor configured to detect the presence of nearby objects in the absence of any physical contact. The sensor assembly 814 may further include a light sensor, such as a CMOS or CCD image sensor, for use in imaging applications. In some examples, the sensor assembly 814 may further include an acceleration sensor, a gyroscope sensor, a magnetic sensor, a pressure sensor, or a temperature sensor.

The communication component 816 is configured to facilitate wired or wireless communications between the user equipment 800 and other devices. The user equipment 800 may access wireless networks based on communication standards, such as WiFi, 2G, 3G, 4G, 5G, or a combination thereof. In one example, the communication component 816 receives broadcast signals or broadcast related information from an external broadcast management system via a broadcast channel. In an example, the communication component 816 further includes a near field communication (NFC) module to facilitate short-range communication. For example, the NFC module may be realized based on radio frequency identification (RFID) technology, infrared data association (IrDA) technology, ultra-wideband (UWB) technology, Bluetooth (BT) technology and other technologies.

In an example, the user equipment 800 may be realized by one or more application specific integrated circuit (ASIC), digital signal processor (DSP), digital signal processing device (DSPD), programmable logic device (PLD), field programmable gate array (FPGA), controller, microcontroller, microprocessor or other electronic component, for performing the above methods.

In an example, there is further provided a non-transitory computer-readable storage medium including instructions, such as the memory 804 including instructions, and the instructions may be executed by the processor 820 of the user equipment 800 to perform the above methods. For example, the non-transitory computer-readable storage medium may be ROM, random access memory (RAM), CD-ROM, magnetic tape, floppy disk, optical data storage device, etc.

Figure 14:
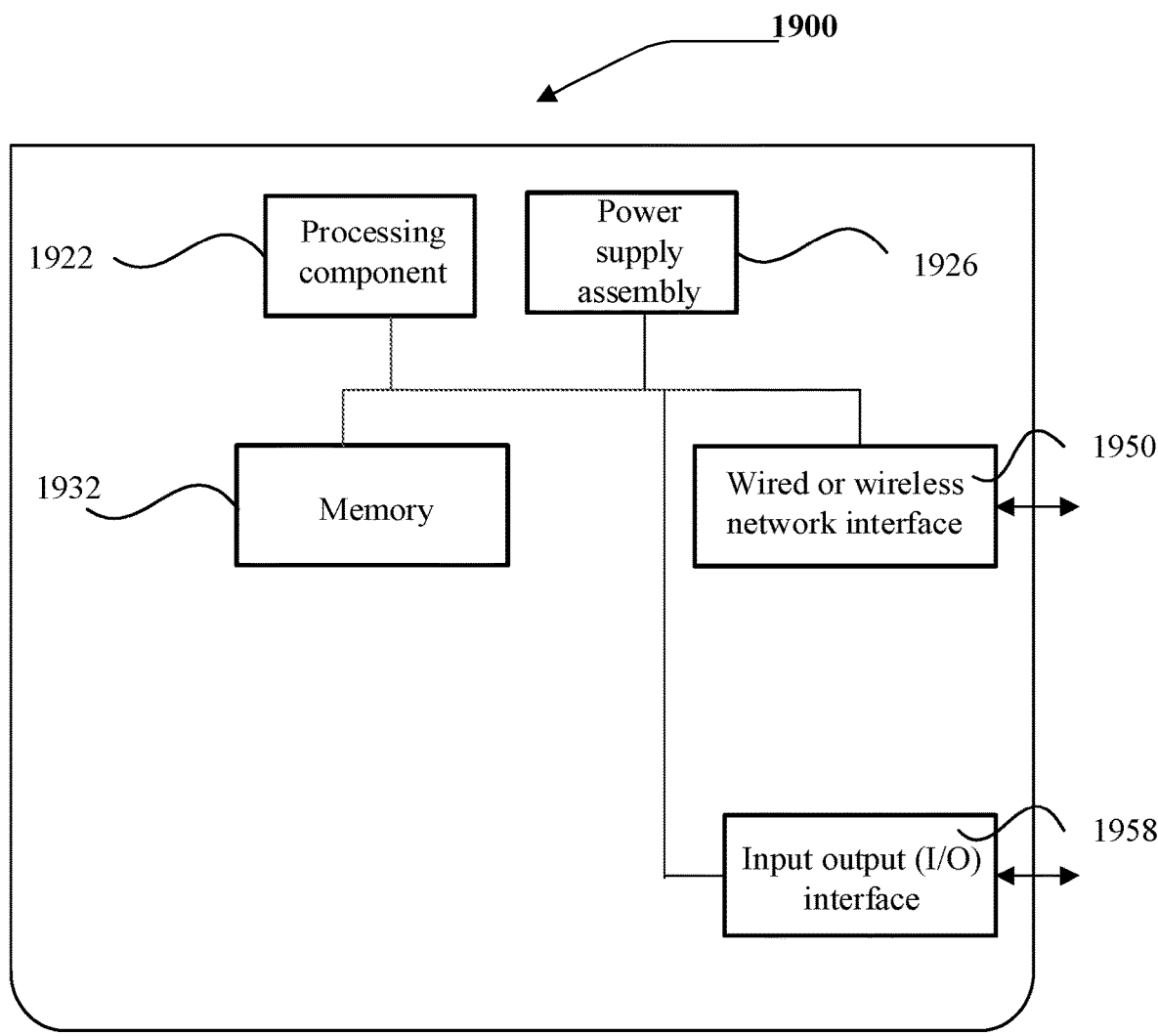
FIG. 14 is a schematic diagram illustrating a base station according to an example of the present disclosure.

As shown in FIG. 14, an example of the present disclosure shows a structure of a base station. For example, the base station 1900 may be provided as a network-side device. Referring to FIG. 14, the base station 1900 includes a processing component 1922, which further includes one or more processors, and memory resource represented by a memory 1932 for storing instructions executable by processing component 1922, such as application programs. An application program stored in the memory 1932 may include one or more modules each corresponding to a set of instructions. Furthermore, the processing component 1922 is configured to execute instructions to execute any of the aforementioned methods applied to the base station, e.g., the method shown in FIG. 4.

The base station 1900 may further include a power supply assembly 1926 configured to perform power management of the base station 1900, a wired or wireless network interface 1950 configured to connect the base station 1900 to a network, and an input output (I/O) interface 1958. Base station 1900 may operate based on an operating system stored in the memory 1932, such as Windows Server™, Mac OS X™, Unix™, Linux™, FreeBSD™ or the like.

Other examples of the disclosure will readily occur to those skilled in the art upon consideration of the specification and practice of the disclosure disclosed herein. This disclosure is intended to cover any modifications, uses, or adaptations of the invention that follow the general principles of the disclosure and include common general knowledge or techniques in the art not disclosed in this disclosure. The specification and examples are to be regarded as exemplary only, with the true scope and spirit of the disclosure being indicated by the following claims.

It should be understood that the present disclosure is not limited to the precise structures described above and illustrated in the accompanying drawings, and that various modifications and changes may be made without departing from its scope. The scope of the present disclosure is limited only by the appended claims.

In an example, there is provided an information processing method, applied to a base station, wherein the method includes:
receiving a buffer status report BSR sent by a first user equipment UE;
sending scheduling information to a corresponding second UE based on at least one of a number of the first UEs and the BSR; and
allocating SL resource to the first UE according to received sidelink SL resource perception information reported by the second UE based on the scheduling information.

In an example, the method further includes: sending, to the first UE, allocation information for indicating the SL resource allocated for the first UE.

In an example, the SL resource perception information reported by the second UE based on the scheduling information at least includes:
information of idle SL resource reported by the second UE based on the scheduling information.

In an example, the idle SL resource includes: idle SL frequency-domain resource; wherein each idle SL frequency-domain resource includes at least one sub-channel, and each sub-channel includes one or more frequency-domain resource blocks.

In an example, the idle SL resource include: idle SL time-domain resource; wherein each idle SL time-domain resource includes one or more time-domain resource within a transmission time interval.

In an example, the sending scheduling information to the corresponding second UE based on at least one of the number of the first UEs and the BSR includes:
according to at least one of the number of the first UEs and the BSR, sending the scheduling information including a reporting-number instruction to the second UE, wherein the reporting-number instruction is adopted to instruct the second UE to report a number of perceived SL resource positions.

In an example, wherein
in response to at least one of that the number of the first UEs reaches a first state and that the BSR reaches a second state, the reporting-number instruction is adopted to instruct the second UE to report a first number of the SL resource positions;
or,
in response to the number of the first UEs does not reach the first state, the reporting-number instruction is adopted to instruct the second UE to report a second number of the SL resource positions;
or,
in response to the BSR does not reach the second state, the reporting-number instruction is adopted to instruct the second UE to report the second number of SL resource positions;
wherein the second number is smaller than the first number.

In an example, the number of the first UEs reaching the first state, includes:
the number of the first UEs sending the BSR reaches a first number threshold;
or,
the BSR reaching the second state, includes:
a buffered data volume indicated by the BSR reaches a first data volume threshold.

In an example, the receiving the sidelink SL resource perception information reported by the second UE based on the scheduling information includes:
receiving the SL resource perception information reported by the second UE by using at least one of a physical uplink control channel and a physical uplink shared channel.

In an example, the BSR carries identification information of the second UE; wherein the identification information is adopted to indicate the corresponding second UE.

In an example, the number of the first UEs is a number of the first UEs connected to the base station, or the number of the first UEs is a number of the first UEs that send the BSR to the base station.

In an example, there is provided an information processing method, applied to a second user equipment UE, wherein the method includes:
receiving scheduling information sent by abase station, wherein the scheduling information is information determined by the base station according to a buffer status report BSR sent by a first UE to the base station; and
based on the scheduling information, reporting to the base station, SL resource perception information, wherein the SL resource perception information is adopted for the base station to allocate SL resource to the first UE.

In an example, the reporting to the base station, SL resource perception information, wherein the SL resource perception information is adopted for the base station to allocate SL resource to the first UE, includes:
sending the information of idle SL resource determined by the second UE to the base station.

In an example, the idle SL resource includes: idle SL frequency-domain resource; wherein each idle SL frequency-domain resource includes at least one sub-channel, and each sub-channel includes one or more frequency-domain resource blocks.

In an example, the idle SL resource include: idle SL time-domain resource; wherein each idle SL time-domain resource includes one or more time-domain resource within a transmission time interval.

In an example, the reporting the SL resource perception information to the base station, includes:
reporting the SL resource perception information to the base station based on at least one of a physical uplink control channel and a physical uplink shared channel.

In an example, there is provided an information processing method, applied to a first user equipment UE, wherein the method includes:
sending a BSR to the base station; wherein the BSR is adopted by the base station to determine scheduling information for scheduling a corresponding second UE to report SL resource perception information;
receiving allocation information sent by the base station based on the SL resource perception information; and
based on the allocation information, sending information to the second UE by using the SL resource allocated by the base station.

In an example, there is provided a base station, wherein the base station includes:
  a first processor; and
  a first memory for storing instructions executable by the first processor;
  wherein the first processor is configured to realize the information processing method according to claim 1 when running a computer service.

In an example, there is provided a second UE, wherein the second UE includes:
  a second processor; and
  a second memory for storing instructions executable by the second processor;
  wherein the second processor is configured to realize the information processing method according to claim 12 when running a computer service.

In an example, there is provided a first UE, wherein the first UE includes:
  a third processor; and
  a third memory for storing instructions executable by the third processor;
  wherein the third processor is configured to realize the information processing method according to claim 17 when running a computer service.

What is claimed is:

1. An information processing method, comprising:
  receiving, by a base station, a buffer status report (BSR) sent by a first user equipment (UE);
  sending, by the base station, scheduling information to a corresponding second UE based on at least one of a number of the first UEs or the BSR; and
  allocating, by the base station, sidelink (SL) resource to the first UE according to received SL resource perception information reported by the second UE based on the scheduling information;
  wherein sending the scheduling information to the corresponding second UE based on the at least one of the number of the first UEs or the BSR comprises:
  according to the at least one of the number of the first UEs or the BSR, sending the scheduling information comprising a reporting-number instruction to the second UE, wherein the reporting-number instruction is adopted to instruct the second UE to report a number of perceived SL resource positions.

2. The method according to claim 1, wherein the method further comprises: sending, to the first UE, allocation information for indicating the SL resource allocated for the first UE.

3. The method according to claim 1, wherein the SL resource perception information reported by the second UE based on the scheduling information at least comprises:
  information of idle SL resource reported by the second UE based on the scheduling information.

4. The method according to claim 3, wherein the idle SL resource comprises: idle SL frequency-domain resource; wherein each idle SL frequency-domain resource comprises at least one sub-channel, and each sub-channel comprises one or more frequency-domain resource blocks.

5. The method according to claim 3, wherein the idle SL resource comprise: idle SL time-domain resource; wherein each idle SL time-domain resource comprises one or more time-domain resource within a transmission time interval.

6. The method according to claim 1, wherein
  in response to determining at least one of that the number of the first UEs reaches a first state or that the BSR reaches a second state, the reporting-number instruction is adopted to instruct the second UE to report a first number of the SL resource positions;
  or,
  in response to determining that the number of the first UEs does not reach the first state, the reporting-number instruction is adopted to instruct the second UE to report a second number of the SL resource positions;
  or,
  in response to determining that the BSR does not reach the second state, the reporting-number instruction is adopted to instruct the second UE to report the second number of SL resource positions;
  wherein the second number is smaller than the first number.

7. The method according to claim 6, wherein the number of the first UEs reaching the first state, comprises:
  the number of the first UEs sending the BSR reaches a first number threshold;
  or,
  the BSR reaching the second state, further comprising:
  a buffered data volume indicated by the BSR reaches a first data volume threshold.

8. The method according to claim 1, wherein the receiving the SL resource perception information reported by the second UE based on the scheduling information comprises:
  receiving the SL resource perception information reported by the second UE by using at least one of a physical uplink control channel and a physical uplink shared channel.

9. The method according to claim 1, wherein the BSR carries identification information of the second UE; wherein the identification information is adopted to indicate the corresponding second UE.

10. The method according to claim 1, wherein the number of the first UEs is a number of the first UEs connected to the base station, or the number of the first UEs is a number of the first UEs that send the BSR to the base station.

11. An information processing method, comprising:
  receiving, by a second user equipment (UE), scheduling information sent by a base station, wherein the scheduling information is information determined by the base station according to a buffer status report (BSR) sent by a first UE to the base station, wherein the scheduling information comprises a reporting-number instruction, and the reporting-number instruction is adopted to instruct the second UE to report a number of perceived sidelink (SL) resource positions; and
  based on the scheduling information, reporting, by the second UE to the base station, SL resource perception information, wherein the SL resource perception information is adopted for the base station to allocate SL resource to the first UE.

12. The method according to claim 11, wherein reporting, by the second UE to the base station, SL resource perception information further comprises:
  sending information of idle SL resource determined by the second UE to the base station.

13. The method according to claim 12, wherein the idle SL resource comprises: idle SL frequency-domain resource; wherein each idle SL frequency-domain resource comprises at least one sub-channel, and each sub-channel comprises one or more frequency-domain resource blocks.

14. The method according to claim 12, wherein the idle SL resource comprise: idle SL time-domain resource; wherein each idle SL time-domain resource comprises one or more time-domain resource within a transmission time interval.

15. The method according to claim 11, wherein reporting the SL resource perception information to the base station, comprises:
reporting the SL resource perception information to the base station based on at least one of a physical uplink control channel or a physical uplink shared channel.

16. A second user equipment (UE), wherein the second UE comprises:
a second processor; and
a second memory for storing instructions executable by the second processor,
wherein the second processor is configured to realize the information processing method according to claim 11 when running a computer service.

17. An information processing method, comprising:
sending, by a first user equipment (UE), a buffer status report (BSR) to a base station; wherein the BSR is adopted by the base station to determine scheduling information for scheduling a corresponding second UE to report sidelink (SL) resource perception information, wherein the scheduling information comprises a reporting-number instruction, and the reporting-number instruction is adopted to instruct the second UE to report a number of perceived SL resource positions;
receiving, by the first UE, allocation information sent by the base station based on the SL resource perception information; and
based on the allocation information, sending information to the second UE by using the SL resource allocated by the base station.

18. A first user equipment (UE), wherein the first UE comprises:
a third processor; and
a third memory for storing instructions executable by the third processor;
wherein the third processor is configured to realize the information processing method according to claim 17 when running a computer service.

19. A base station, wherein the base station comprises:
a first processor; and
a first memory for storing instructions executable by the first processor;
wherein the first processor is configured to realize the information processing method according to claim 1 when running a computer service.

* * * * *